April 26, 1955 — A. G. SCHILBERG — 2,707,100
CONTROL ARM FOR VEHICLE WHEEL SUSPENSION
Filed June 18, 1952
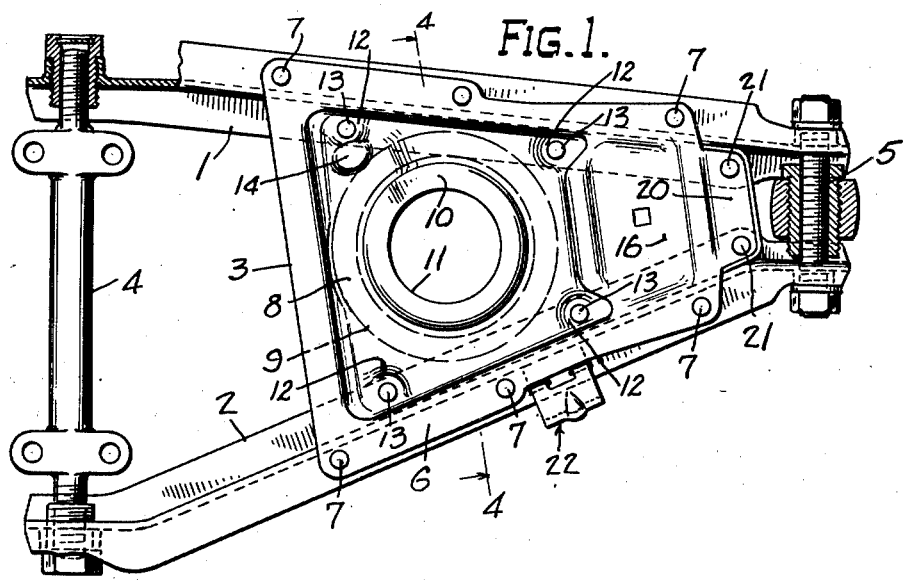
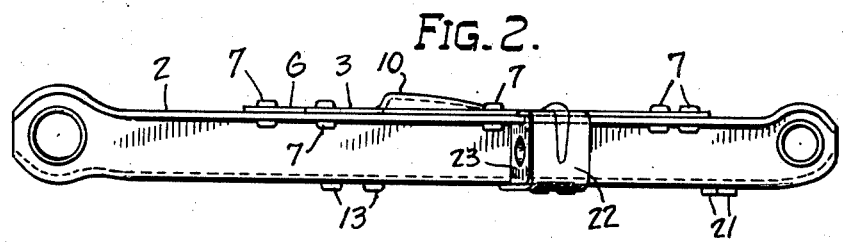
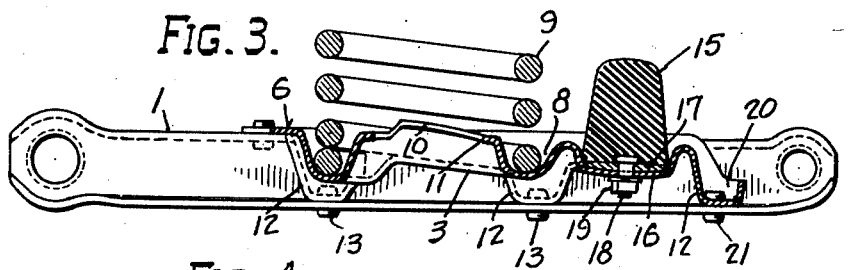
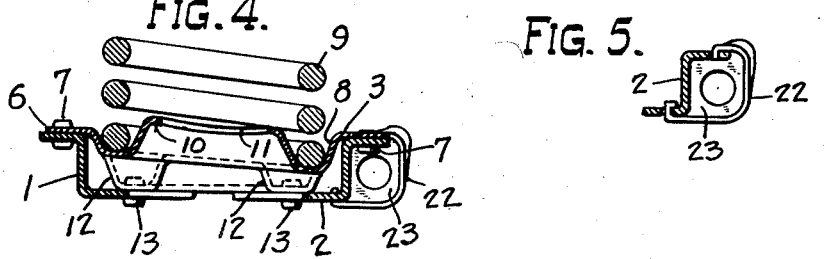
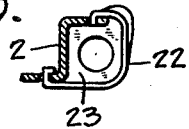
INVENTOR.
Arnold G. Schilberg
BY Andrus & Scales
ATTORNEYS.

United States Patent Office 2,707,100
Patented Apr. 26, 1955

2,707,100

CONTROL ARM FOR VEHICLE WHEEL SUSPENSION

Arnold G. Schilberg, Milwaukee, Wis., assignor to A. O. Smith Corporation, Milwaukee, Wis., a corporation of New York Application June 18, 1952, Serial No. 294,250

4 Claims. (Cl. 267—20)

This invention relates to automotive wheel suspension and more particularly to a control arm for independent wheel suspension.

An object of the present invention is to provide a lower control arm for independent wheel suspension which is of simple construction and fabricated from light weight metal stampings.

Another object of the invention is to provide a control arm which may be more readily assembled by constructing the wish-bone arms with a substantially Z-shaped cross section to facilitate the attachment of the spring seat tray thereto.

Still another object is to provide a control arm which has greater stability and is more capable of withstanding twisting moments than the ordinary type of control arm.

The control arm of the present invention is formed, in general, of a pair of flanged wish-bone shaped arms connected by a tray-like plate providing a spring seat therebetween.

The inner ends of the arms are pivotally attached to a shaft which in turn is connected to the frame of the automobile. The outer ends of the arms carry the steering knuckle and stub axle for the wheel.

The arms are formed with a substantially Z-shaped cross section and the tray is provided with a contour such that it is attached to both the upper and lower flanges of the arms. By this construction any downward force on the tray will be carried by the arms rather than by the attaching means, such as rivets, bolts or the like. In addition, this construction facilitates assembly by positioning the rivets or other attaching means in easily accessible places where automatic attaching devices may be employed to secure the rivets.

The combination of the Z-shaped arms and the similarly contoured tray affords greater stability to the structure. The parts cooperate to provide an extremely rigid construction which will resist twisting moments and restrict movement of one of the arms relative to the other.

Other objects and advantages of the invention will appear in the course of the following description.

In the drawings:

Figure 1 is a top plan view of the control arm of the invention;

Figure 2 is a side elevational view of the control arm of Figure 1;

Figure 3 is a longitudinal vertical section of Figure 1;

Figure 4 is a section taken on line 4—4 of Figure 1; and

Fig. 5 is a detailed section showing the attachment of the stabilizer rod bracket.

Referring to the drawings, the control arm comprises, in general, a pair of arms 1 and 2 connected by a tray 3 configured to form a spring seat between the arms.

Arm 1 is formed from sheet metal and has a generally Z-shaped cross section and arm 2 has the same construction as arm 1 except for a reversal in shape. Thus the upper and lower flanges of each arm are arranged oppositely with the upper flange of each arm extending outwardly of the structure. The arms 1 and 2 are positioned at an angle to each other, like a wish-bone, with the corresponding ends of arms 1 and 2 shaped to extend substantially parallel. The magnitude of the angle between arms 1 and 2 depends on the particular structural characteristics of the vehicle to which the control arm is to be associated.

To permit the arms 1 and 2 to be attached to the frame of the vehicle, not shown, the inner ends of the arms are enlarged and provided with aligned embossed threaded openings which receive the threaded ends of a bearing shaft 4 upon which the control arm pivots. Shaft 4 is in turn secured to the frame of the vehicle.

As the outer ends of arms 1 and 2 carry the wheel, they are enlarged and are similarly formed with aligned embossed openings which threadedly receive a bolt 5 which holds the end steering knuckle and stub axle for the wheel, not shown.

Tray 3 which connects arms 1 and 2 is also formed from sheet metal. To attach tray 3 to arms 1 and 2 the tray is provided with a flat peripheral rim or flange 6 which rests flatwise on the upper flanges of arms 1 and 2 and is secured thereto by rivets 7.

The spring seat in tray 3 is formed of a generally circular, varying depth groove 8 adapted to receive the lower end of a coil spring 9. The coil receiving portion 10 of tray 3 encircled by groove 8 is provided with an opening 11 to lighten the weight of the tray.

In order to give the structure greater stability and rigidity, tray 3 is also secured to the lower inwardly extending flanges of arms 1 and 2. This is accomplished by providing tray 3 with a plurality of depressions 12 to the outside of groove 8 and of sufficient depth to contact the lower flanges of arms 1 and 2. Attachment of depressions 12 to arms 1 and 2 is accomplished by rivets 13.

The coil spring 9 is aligned within groove 12 by means of knob 14 which is disposed between one of the depressions 12 and groove 8 and the lower end of the spring when seated in groove 12 bears against knob 14.

The arms 1 and 2 are prevented from hitting the frame side bar by means of a rubber bumper 15 which is secured within a cup-like depression 16 in the outer portion of tray 3.

A supporting disc 17 is attached to the bottom of bumper 15 and is disposed in flatwise contact with the bottom of depression 16. To secure bumper 15 within depression 16 a square shafted bolt 18 depending from disc 17 extends through a suitable square opening in depression 16 and is threadedly engaged by a nut 19.

To attach the outer end of tray 3 to arms 1 and 2, the outer portion of the tray is provided with a transverse channel 20 which is supported by the lower flanges of arms 1 and 2. Rivets 21 are employed to secure the transverse channel 20 of tray 3 to the respective lower flanges.

Roll of the vehicle to which the control arm is applied is prevented by the attachment of a torsion stabilizer rod, not shown, to a stabilizer bracket 22 which extends from the side of arm 2. Bracket 22 is attached to arm 2 by means of the tensioning engagement of the bent edges thereof within suitable slots in the upper and lower flanges, respectively, of the arm 2, as shown in Fig. 5. Bracket 22 confines a rubber cushion 23 which is provided with a central opening to receive the stabilizer rod.

The present Z-shaped construction of arms 1 and 2 with the tray 3 being attached to both the upper and lower flanges of the arms provides maximum rigidity for the control arm of the invention. As the upper and lower portions of the arms are connected together by tray 3 the tray acts as a cross brace and prevents sidewise motion of one arm relative to the other. The arms 1 and 2 and tray 3 also cooperate to provide a strong integral structure so that the parts may be stamped from thinner gauge stock than the conventional control arm without loss of strength and the size of the rivets may also be correspondingly decreased. With tray 3 supported on both the upper and lower flanges of the arms 1 and 2 the load on the tray is carried by the arms and not by the rivets, thus preventing distortion and failure of the rivets in service.

Rivets 7, 13 and 21 are positioned in easily accessible locations so that they may be readily attached with automatic devices. There are no rivets disposed in blind locations where extremely difficult and time consuming manual operations are required to insert and bead the same.

Various embodiments of the invention may be employed within the scope of the accompanying claims.

I claim:
1. A control arm for independent wheel suspension for vehicles, which comprises a pair of spaced sheet metal arms, each of said arms having an outwardly extending upper flange, an inwardly extending lower flange and a substantially vertical connecting web portion, support means interconnecting said arms with said means overlying the upper and lower flanges of said arms, and means attaching both the upper and lower flanges of said arms to the support means for supporting a coil spring.

2. A control arm for attachment to the frame of a vehicle for independent wheel suspension, which comprises a pair of sheet metal arms disposed at an angle to each other and formed with a substantially Z-shaped cross section with the upper flanges of said arms facing outwardly, and a sheet metal tray interconnecting said arms and resting on and secured to both the upper and lower flanges of the arms, said tray being adapted to support a coil spring adjacent the central portion of said arms, and a resilient bumper supported on said tray at the outer ends of said arms for preventing the structure from striking the side bar of said frame.

3. A control arm for seating a coil spring of a vehicle, which comprises a pair of sheet metal Z-shaped arms extending side by side to form a generally wish-bone shaped structure, a sheet metal tray disposed between said arms and having a flanged rim resting on the upper flange of each arm and depressed portions resting on the lower flange of each arm, means to secure the tray to the upper and lower flanges of the arms through the flanged rim and depressed portions, and an annular depression disposed generally centrally of the tray to provide a seat for receiving the lower end of said coil spring.

4. A control arm for attachment to the frame of a vehicle for independent wheel suspension, which comprises a pair of sheet metal arms disposed at an angle to each other and formed with a substantially Z-shaped cross-section providing upper outwardly extending flanges and lower inwardly extending flanges, a sheet metal tray-like plate disposed complementary to the Z-shaped arms and having upper portions overlying and resting on the upper flanges of said arm and lower portions overlying and resting on the lower flanges of said arms, and means securing said portions of the tray to both the upper and lower flanges of the arms for supporting a coil spring.

References Cited in the file of this patent

UNITED STATES PATENTS

| | | |
|---|---|---|
| 2,298,585 | Phelps | Oct. 13, 1942 |
| 2,344,896 | Phelps | Mar. 21, 1944 |
| 2,483,974 | Hicks et al. | Oct. 4, 1949 |

FOREIGN PATENTS

| | | |
|---|---|---|
| 540,646 | Great Britain | Oct. 24, 1941 |